United States Patent

Chang et al.

[11] Patent Number: 5,286,468
[45] Date of Patent: Feb. 15, 1994

[54] PRODUCING CARBON-14 ISOTOPE FROM SPENT RESIN WASTE

[75] Inventors: Francis H. Chang, Scarborough; Harold K. Vogt, Oakville; Leonard S. Krochmalnek, Downsview; Savtantar K. Sood, Mississauga; Frank E. Bartoszek, Toronto; Kenneth B. Woodall; Jeffrey R. Robins, both of Oakville, all of Canada

[73] Assignee: Ontario Hydro, Toronto, Canada

[21] Appl. No.: 658,503

[22] Filed: Feb. 21, 1991

[51] Int. Cl.$^5$ .................. C01B 31/18; C01B 31/20; C01F 11/18
[52] U.S. Cl. .................. 423/249; 252/626; 252/630; 423/437
[58] Field of Search .......... 252/626, 630; 423/249, 423/437

[56] References Cited

U.S. PATENT DOCUMENTS

| | | | |
|---|---|---|---|
| 2,532,490 | 12/1950 | Fries | 423/249 |
| 2,622,008 | 12/1952 | Mizler et al. | 423/249 |
| 3,203,866 | 8/1965 | Lehmer et al. | 252/630 |
| 3,487,651 | 1/1970 | Schleich et al. | 423/249 |
| 3,535,079 | 10/1970 | Palko | 423/249 |
| 3,957,676 | 5/1976 | Cooley et al. | 252/626 |
| 4,012,490 | 3/1977 | Lofredo | 252/630 |
| 4,162,298 | 7/1979 | Holladay et al. | 252/630 |
| 4,270,938 | 6/1981 | Schmidt et al. | 252/630 |
| 4,383,969 | 5/1983 | Bleier | 252/630 |
| 4,417,909 | 11/1983 | Weltmer | 252/630 |
| 4,435,644 | 3/1984 | Heki | 252/630 |
| 4,437,999 | 3/1984 | Mayne | 252/626 |
| 4,447,353 | 5/1984 | Pence et al. | 252/630 |
| 4,492,649 | 1/1985 | Cheh et al. | 252/630 |
| 4,770,783 | 9/1988 | Gustavsson et al. | 252/628 |
| 4,849,155 | 7/1989 | Penzhorn et al. | 252/630 |

OTHER PUBLICATIONS

Gotz et al "$^{13}C/^{12}C$ and $^{18}O/^{16}O$ liquid–vapor isotopic fractionation factors in CO as a function of temperature", J. Chem. Phys. 70, 5731 (1979).
Lee et al "Erratum" J. Chem. Phys. 77, p. 7260 (1982).

*Primary Examiner*—Edward A. Miller
*Attorney, Agent, or Firm*—Ridout & Maybee

[57] ABSTRACT

A method for the recovery of carbon-14 (C-14) from a mixture of inert gas and carbon-12 (C-12), carbon-13 (C-13) and C-14 dioxides. The mixture is cooled to a temperature below the solidification point of carbon dioxide to obtain solid carbon dioxide. The solid carbon dioxide is volatilized to provide substantially pure carbon dioxide gas which is reduced to carbon monoxide gas by reaction with metal. The carbon monoxide gas is cooled to obtain liquefied carbon monoxide. A feed of the liquefied carbon monoxide is subjected to fractional distillation and a bottoms rich in C-14 monoxide and poor in C-12 monoxide is collected and a distillate poor in C-14 monoxide and rich in C-12 monoxide is removed. The bottoms are oxidized to carbon dioxide rich in C-14 dioxide which is absorbed in a metal hydroxide solution and a carbonate salt rich in C-14 is obtained.

22 Claims, 4 Drawing Sheets

PRODUCING CARBON-14 ISOTOPE FROM SPENT RESIN WASTE

This invention relates to a method for the recovery of carbon-14 from a mixture of inert gas and carbon-12, carbon-13 and carbon-14 dioxides.

In nuclear reactors, radioactive carbon-14 (C-14) is formed mainly by neutron activation of oxygen-17, nitrogen-14, and to a small extent, carbon-13. The C-14 thus produced and then entrapped in the water coolant or the moderator water of a nuclear reactor, together with carbon-12 and carbon-13, is removed by the ion-exchange resins of the water purification ion-exchange columns. The carbon on the resins may be present in a variety of chemical forms. The volume of the resin waste generated each year is quite large, and the C-14 contaminant has a very long half-life (5730 years). The separation of C-14 from the spent resin can significantly reduce the cost of disposing of the resin waste. The separated C-14 may also become a source for supplying the commercial C-14 isotope market.

Co-pending patent application Ser. No. 07/570,415 filed Aug. 21, 1990, and now abandoned, describes a method for separation of C-14 from ion exchange resin wherein a slurry of the resin particles in an aqueous acidic solution is agitated and at the same time an inert gas such as nitrogen, helium or argon is bubbled through the agitated slurry. The acid solution decomposes carbon-containing compounds (usually carbonates, bicarbonates and mixtures thereof) that are loaded on the resin particles to yield carbon dioxide ($CO_2$). The inert gas that is bubbled into the agitated slurry has a content of $CO_2$ sufficiently low that its bubbles absorb $CO_2$ from the slurry. $CO_2$ laden gas bubbles evolving from the slurry are collected. The agitation of the slurry serves to drive resin particles bodily through the slurry and the agitation is performed with sufficient intensity to dislodge gas films that tend to build up on the surface of the resin particles and the purge gas bubbles that tend to attach to the particles. The agitation should preferably be such that substantially no gas films are visible to the eye on the surface of the resin particles, in order that substantially all acid decomposable forms of carbon compounds can be consistently and repeatably removed from the resin particles.

The above process effectively strips the resin, allowing its disposal in low grade disposal facilities, and produces a gas stream containing a mixture of an inert gas and C-12, C-13 and C-14 dioxides. Purified C-14 is a valuable commercial product with applications in medical, pharmaceutical, agricultural and chemical research. Currently, commercial C-14 is made by a time consuming and expensive process in which aluminium nitride targets are irradiated for 4.5 years. There is therefore a need for an effective method for recovery of the C-14 in purified form, preferably at least about 95% C-14, from the gas stream mentioned above or like gas mixtures.

The method of the present invention provides a highly advantageous and efficient method for recovery of C-14 from such gas mixtures comprising a sequence of steps which when performed under properly controlled conditions are readily capable of providing a product which is of high C-14 purity.

The invention provides a method for recovery of carbon-14 (C-14) from a mixture of inert gas and carbon-12 (C-12), carbon-13 (C-13) and C-14 dioxides comprising: (a) cooling said mixture to a temperature below the solidification point of carbon dioxide to obtain solid carbon dioxide and separating said solid carbon dioxide from said inert gas; (b) volatilising said solid carbon dioxide to provide substantially pure carbon dioxide gas; (c) reducing said carbon dioxide gas to carbon monoxide gas by reaction with metal; (d) cooling said carbon monoxide gas and obtaining liquefied carbon monoxide; (e) subjecting a feed of said liquefied carbon monoxide to fractional distillation and obtaining a bottoms residue rich in C-14 monoxide and poor in C-12 monoxide and distillate poor in C-14 monoxide and rich in C-12 monoxide; (f) oxidizing said bottoms to carbon dioxide rich in C-14 dioxide and (g) absorbing said carbon dioxide rich in C-14 dioxide in a metal hydroxide solution and obtaining a carbonate salt rich in C-14.

In a first step in the above method, the gas mixture is cooled to solidify the carbon dioxide content so that it can be readily separated from the inert gas which remains in the gas phase. Although it is possible to separate the carbon dioxide from the inert gas by other means, for example by absorbing it in a reagent chemically reactive with the carbon dioxide, such as an alkaline solution, the problem then remains that for efficient operation and to avoid build up of contaminated wastes it is necessary subsequently to purge the carbon dioxide from the absorbent and in practice this requires purging with a carrier fluid such as an inert gas which then itself becomes a carbon-14 dioxide laden stream which thus again presents the problem of separation which was originally to be dealt with. In the present process, cryo-freezing of the carbon dioxide content of the gas mixture results in the removal of substantially all carbon dioxide so that a substantially carbon-dioxide free gas stream is obtained.

In the next stage, the solid carbon dioxide separated from the gas stream is volatilised to yield carbon dioxide gas which is converted to carbon monoxide with a view to conducting fractional distillation of the carbon monoxide in liquefied form.

Various procedures for conversion of carbon dioxide to carbon monoxide are possible, such as reaction with carbon, decomposition to yield carbon monoxide and oxygen, and reaction with hydrogen gas to yield water vapour and carbon monoxide. However, reaction with carbon requires high temperatures and results in dilution of the C-14 with carbon dioxide produced by oxidation of the carbon. Decomposition also requires high temperatures unless the gas is exposed to an electrical discharge. This however results in disassociation of some of the carbon monoxide product to carbon and oxygen. Reaction with hydrogen can be achieved in the presence of a discharge or in the presence of a catalyst. However, use of discharge such radio frequency, microwave or high voltage electrical discharges tend to result in formation of undesired by-products such as hydrocarbons. With the known catalysts, certain of these tend to result in production of substantial quantities of methane byproducts while others will achieve a satisfactorily high conversion efficiency only if a large excess of hydrogen and a high temperature are used and the water formed is immediately removed from the reaction system to shift the equilibrium of the reaction. After the reaction is completed, there remains the problem of separating the carbon monoxide from the excess of hydrogen and from the unreacted carbon dioxide as well as from the other reaction product (water).

In the present invention, the carbon dioxide is converted to carbon monoxide by reduction reaction with a metal.

Such reduction reaction is preferably carried out at moderately elevated temperature, for example about 473 to 773 K, more preferably about 573 to about 723 K to achieve high conversion efficiencies of carbon dioxide to monoxide. Suitable metals include zinc, copper and iron. Zinc is preferred by reason of its excellent reactivity. As will readily be apparent to those skilled in the art, other metals may be employed that efficiently reduce carbon dioxide to carbon monoxide at moderately elevated temperature. Examples of such metals may be obtained by consulting standard texts for example Miller, J. W., "A Comprehensive Treatment of Inorganic and Theoretical Chemistry" Vols. IV and V, Longmans Green and Company 1952. Of especial interest are Vol. IV pp. 413 and Vol. V pp. 64 and 943, the disclosures of which are incorporated herein by reference.

In the preferred form, the carbon dioxide is contacted at elevated temperature with the metal in finely divided form dispersed on an inert porous carrier such as asbestos or alumina, in order to prevent plugging.

As far as the applicants are aware, before the present invention separation of C-14 by cryogenic fractional distillation of carbon monoxide has not been carried out. In order to determine the feasibility of such distillation it was necessary to calculate various vapour pressure ratios since it was necessary to determine the vapour pressure ratios of the nine molecular species made up of the nine possible combinations of C-12, -13 and -14 and oxygen -16, -17 and -18 (O-16, -17 and -18). In addition, in order to investigate the practicability of obtaining commercially useful rates of production of C-14 monoxide it was necessary to carry out trial distillations of various mixtures of CO isotopic species. As a result of such investigations carried out by the applicants, the cryogenic CO distillation method has been found to be a practical, highly efficient and advantageous method for recovery of C-14 rich fractions from mixtures of carbon isotopes. Although other procedures for C-14 enrichment are possible, the present method has distinct advantages over such methods. For example, C-14 enrichment can be obtained by isotopically selective laser radiation induced dissociation of formaldehyde ($CH_2O$) or of halogenated methanes. However, dissociation of halogenated methanes produces relatively low levels of enrichment and the synthesis of halogenated methanes from carbon dioxide or carbon monoxide is complicated and expensive. Dissociation of $CH_2O$ provides higher yields of C-14 but in order to obtain 95% C-14 at least two laser enrichment stages would be required and recovery of the dissociation products (CO and $H_2$) from the first enrichment stage and resynthesizing $CH_2O$ therefrom for a second treatment is again relatively complex and expensive.

The applicants have found that liquefied CO containing small amounts of C-14, for example about 0.5% to about 2% C-14, such as are obtained as a result of the ion exchange resin stripping processes referred to above can be readily fractionally distilled to yield C-14 purities of at least about 95%, or higher, for example about 99%. Although a large number of theoretical plates are required, because the vapour pressure ratios between the less volatile C-14 and the more volatile C-12 species at the applicable temperatures are small, a satisfactory throughput and yield can be achieved with relatively compact apparatus because the rate of production of the starting material obtained from, for example, the resin stripping procedure mentioned above, is relatively small, and the value of even small quantities of the end product, C-14, is high. Moreover, the fractional distillation procedure is relatively simple to operate and can be applied directly using the carbon monoxide produced by the reduction process referred to above without requiring further steps of chemical synthesis.

In the course of the distillation procedure, a bottoms residue, containing the less volatile C-14 monoxide species, is collected, and the distillate, containing the more volatile C-12 and C-13 monoxides is separated off and disposed of.

The resulting C-14 monoxide is oxidized to C-14 dioxide which is packaged by absorbing it in a metal hydroxide solution and obtaining a C-14 carbonate salt which is a commercially saleable product.

Preferably, the oxidation is conducted by mixing the C-14 carbon monoxide with oxygen and oxidizing it over an oxidation catalyst, for example platinum or the like, at elevated temperature. The carbonate salt which is the final form of the product is preferably barium carbonate, because of its low vapour pressure. However, reaction of C-14 dioxide directly with barium hydroxide solution may result in problems of clogging of the gas injection orifices by the barium carbonate precipitate. In some circumstances, therefore it may be preferable to initially absorb the C-14 dioxide in a metal, preferably alkali metal, hydroxide solution yielding a soluble carbonate, for example sodium hydroxide, and then form the barium carbonate precipitate by double decomposition of the resulting metal carbonate solution with a barium salt solution, for example a solution of barium chloride.

BRIEF DESCRIPTION OF THE DRAWINGS

The process will now be described in more detail, by way of example only, with reference to the accompanying drawings in which.

Figure 1:
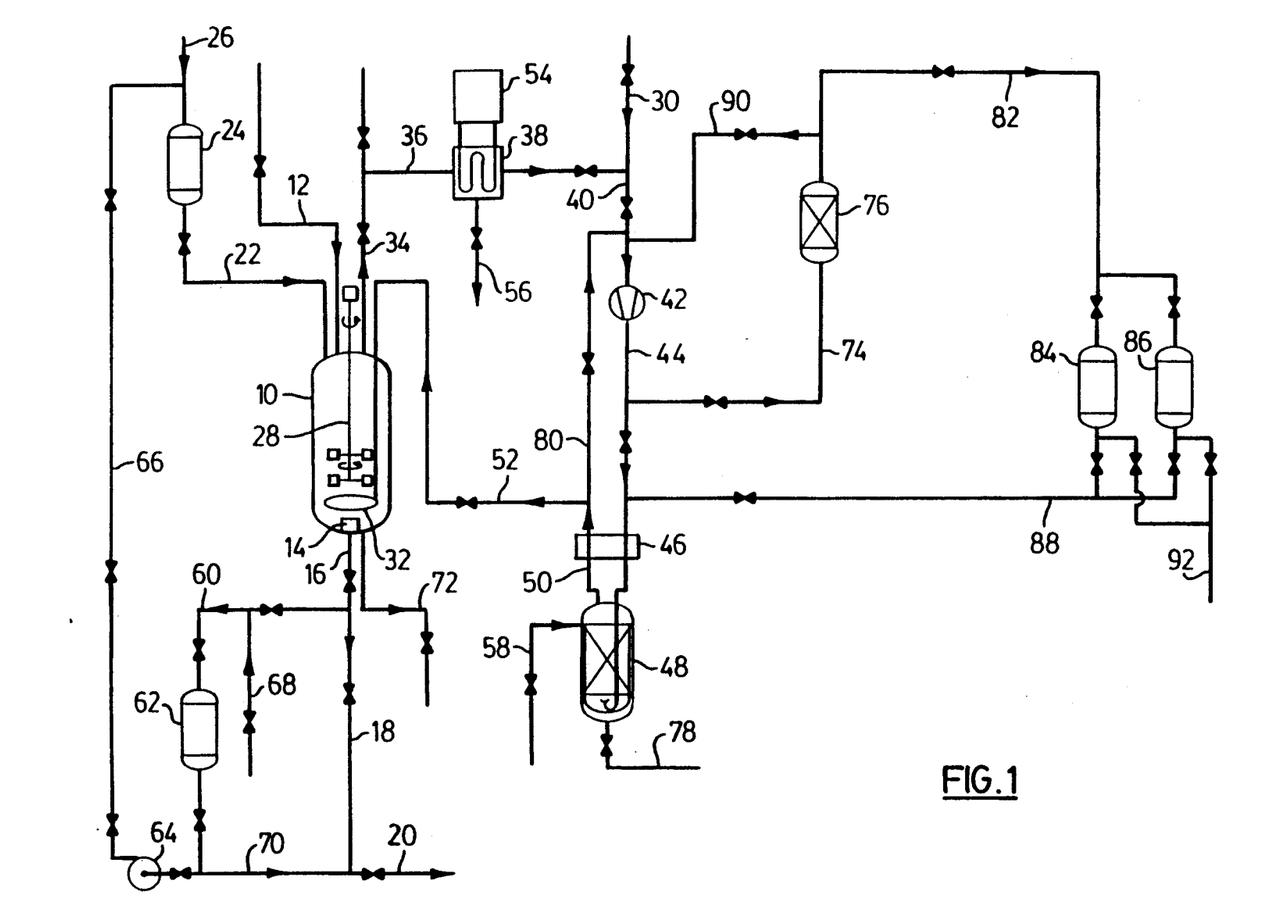
FIGS. 1, 2 and 3 show, somewhat schematically, one form of apparatus for carrying out the present process.

Referring to the drawings, FIG. 1 shows apparatus for stripping the resin to yield a stream of inert gas mixed with carbon dioxide, for cryofreezing the gas stream to yield solid carbon dioxide and for reduction of the carbon dioxide to yield carbon monoxide.

With regard to the portion of the apparatus used for stripping the resin, the resin stripping process is described in some detail in the above-referred to co-pending application Ser. No. 07/570,415 filed Aug. 21, 1990 the disclosure of which is incorporated herein by reference.

Briefly a reactor 10 is provided, into which a measured batch of resin particles is slurried along a line 12. The carrier liquid is then drained out through a filter 14 in the bottom of the reactor 10 along lines 16, 18 and 20 to active liquid waste collection. As will be noted from the drawings, the lines are provided with control valves for controlling flow of gases, liquids and slurries there along. Generally, the functioning of these valves is readily apparent to those skilled in the art and need not be described in detail herein. A measured quantity of an aqueous acid solution, for example 6N hydrochloric acid is then run into the reactor along a line 22, either from a recycled acid storage tank 24 or through the tank 24 from a fresh acid supply line 26. The agitator 28 is operated and an inert gas, preferably helium, having been fed into the system through a supply line 30 is circulated along a loop comprising a sparger 32, gas outlet line 34 at the top of the reactor, and a line 36 including a heat exchanger 38. A line 40 connects the heat exchanger 38 to the suction side of a vacuum pump 42, and a line 44 connects the pressure side of the pump 42, and a heat exchanger 46, to the interior of a cryofreezer vessel 48. An outlet line 50 passing through the heat exchanger 46 connects to the sparger 32 along a line 52.

In use, carbon dioxide liberated by reaction between the acid and the ion exchange resin in the reactor 10 transfers into the inert gas bubbles passing upwardly through the reactor from the sparger 32 and the carbon dioxide laden inert gas mixture is collected and withdrawn as off gas from the reactor along the line 34.

Typically the C-14 is on the resin in the form of carbonate or bicarbonate ion and the liberation reaction is $R-HCO_3 + HX \rightarrow R-X + H_2O + CO_2$ $R_2-CO_3 + 2HX \rightarrow 2R-X + H_2O + CO_2$ wherein R is the ion exchange resin, and X is the acid anion. The heat exchanger 38 cools the gas mixture to a temperature above the solidification point of $CO_2$ and preferably in the range about 274 to about 283 K in order to cause condensation of moisture from the gas mixture. Preferably it is maintained at an operating temperature of about 280 K by a refrigerant device 54, and condensed moisture from the off gas mixture from the reactor is collected along a line 56 and passed to active liquid waste collection. The dried gas mixture passed by the pump 42 along line 44 is cooled in the heat exchanger 46 and enters the cryofreezer 48 which is maintained at a temperature sufficiently low to solidify the carbon dioxide without changing the state of the inert gas. For example, the cryofreezer 48 may be maintained at a temperature of 77 K by addition of liquid nitrogen along a line 58. The inert gas, freed of its content of carbon dioxide which solidifies as a frost layer on the inner side of the vessel 48, is warmed by heat exchange with the incoming gas along line 44 in the heat exchanger 46 before recirculating to the sparger 32.

After a period sufficient to liberate substantially all carbon dioxide from the resin and to collect substantially all the carbon dioxide in the cryofreezer 48, the vessel 48 is isolated from the reactor 10 by closing the appropriate valves. Acid from the reactor 10 is drained along lines 16 and 60 to a storage tank 62. The acid is normally recycled to the reactor 10 so that one batch of acid will strip a number, for example three, batches of resin. In this case the acid is pumped from the tank 62 by a pump 64 along line 66 to the recycled acid storage tank 24 for use in the above described cycle of operation. Otherwise, the spent acid in tank 62 is neutralized by addition of a neutralizing agent, for example NaOH, along a line 68, and the neutralized acid is passed along a line 70 to active liquid waste collection. The depleted resin is slurried out of the reactor 10 along a dump line 72.

The solid carbon dioxide in vessel 48 is volatilized, and is reduced to carbon monoxide and stored under pressure in a storage tank. Connected to the pressure side of the vacuum pump 42 along a line 74 is a reduction reactor vessel 76 containing metal capable of reducing $CO_2$ to CO, dispersed in a porous carrier. In the preferred form, the metal is zinc powder dispersed on an inert porous substrate such as asbestos or alumina. The vessel 76 is equipped with an electrical resistance heater so that in use it is maintained at an elevated temperature, e.g. 673 K. Liquid nitrogen is drained from the coolant side of the cryofreezer vessel 48 along a drain line 78 so that the vessel 48 is allowed to warm up. This warming up and the accompanying volatilisation of the carbon dioxide may be accelerated if desired or necessary by electrical resistance heating of the vessel. The evolved carbon dioxide is collected along a line 80 connecting to the suction side of the pump 42 which passes it to the reduction vessel 76 where the carbon dioxide is reduced to carbon monoxide:

$CO_2 + Zn \rightarrow CO + ZnO$

The gas is passed in a closed loop from the vessel 76 along line 82 selectively to the inlet of and through one of two storage tanks 84 or 86 and from the tank 84 or 86 back to the cryofreezer vessel 48 along lines 88 and 44. The gases are circulated until substantially all $CO_2$ has been converted to CO. The inlet to the selected tank 84 or 86 is then closed and a line 90 between the suction side of the pump 42 and the reduction vessel 76 is opened. The pump 42 is then operated to pump out the residual contents of the vessels 48 and 76 and to pass the compressed CO gas along line 88 to the selected tank 84 or 86. The outlet is then closed so that the CO gas is then confined in the tank 84 or 86. The above cycle of operation commencing with slurrying a measured batch of resin particles into reactor 10 can then be repeated.

Figure 2:
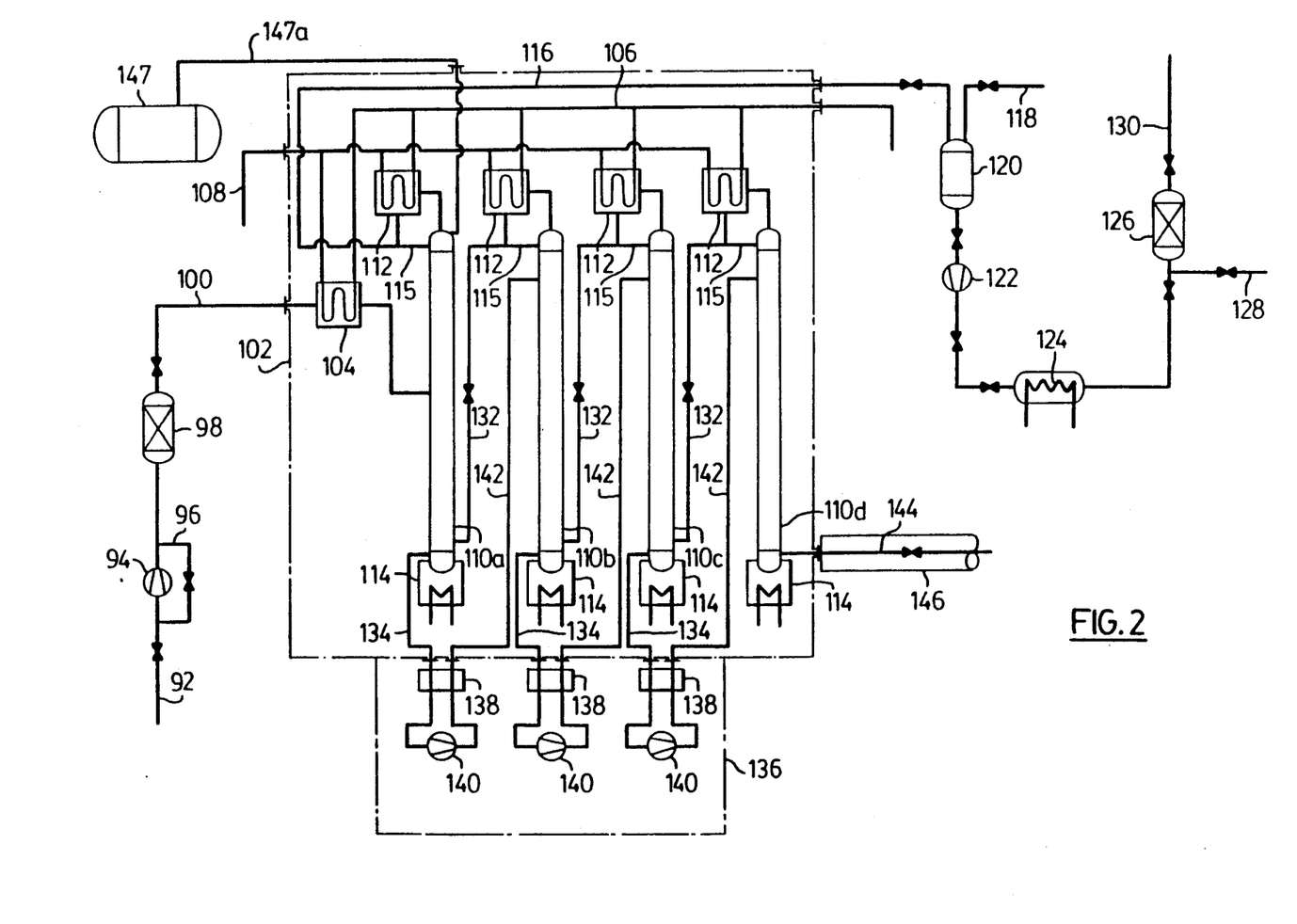

Throughout the operation, while one of the tanks 84 or 86 is in service collecting compressed CO gas the other is in service supplying $CO_2$ to the fractional distillation apparatus shown in FIG. 2 along a line 92.

Figure 4:
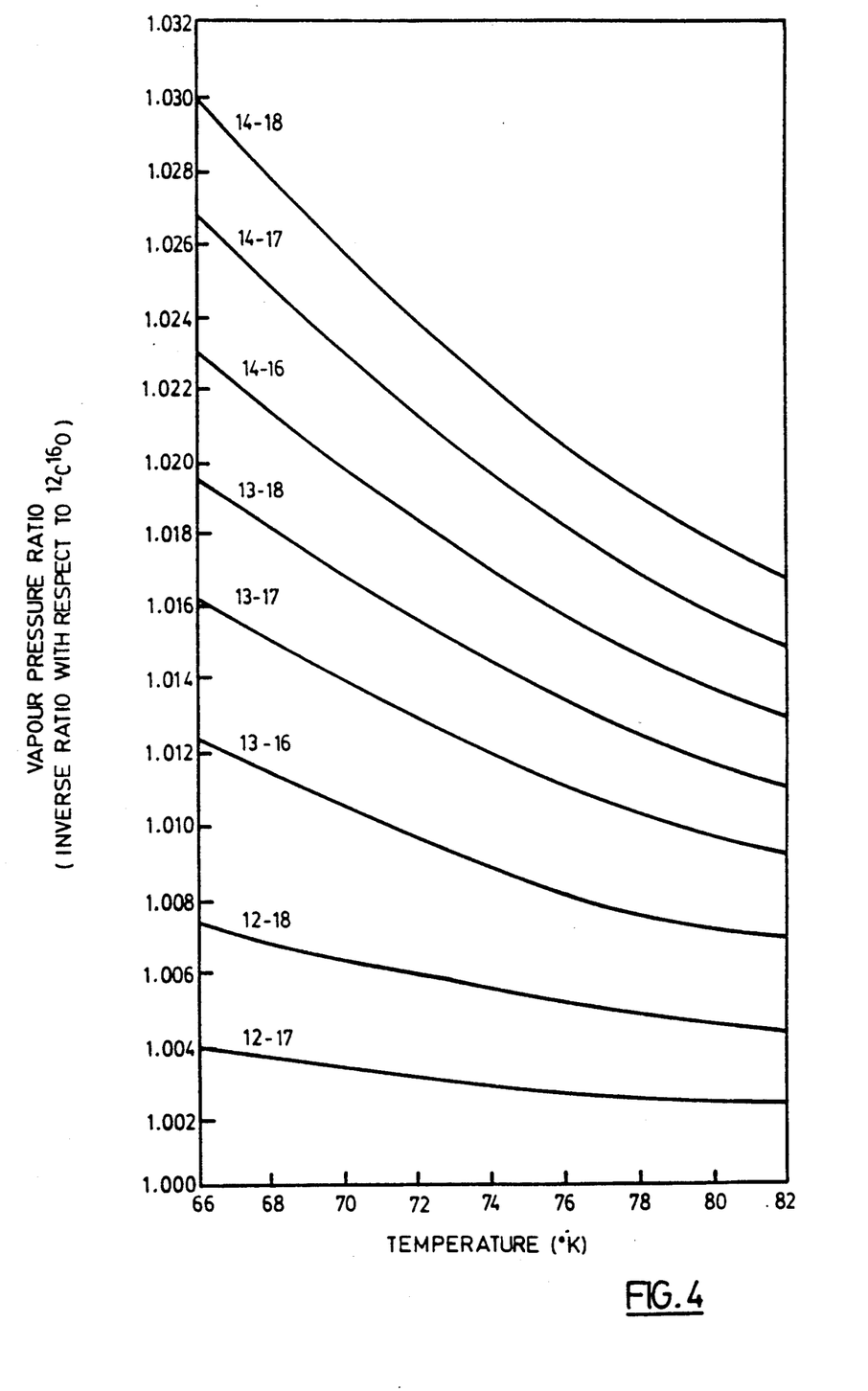
FIG. 4 is a graph of the ratios of the vapour pressure of C-12 O-16 to various isotopic species of CO against temperature.

At this point reference may be made to FIG. 4 which shows the ratio of the vapour pressure of various isotopic species of CO to the vapour pressure of liquid C12 0-16 at various temperatures. The numerals 14-18, for example refer to C-14 0-18, etc. Since the vapour pressures of species with molecular weights higher than C-12 0-16 are all lower than that of C-12 0-16, the ratios graphed are inverse ratios (V.P. of C-12 0-16/V.P. of other monoxides e.g. C-14 0-18). As will be apparent from FIG. 4, at the relevant temperatures the upper pressure ratios or separation factors are favourable for separation of C-14 monoxide from C-13 and C-12 monoxides.

It will be seen from FIG. 4 that the separation per unit column length is greater at lower temperatures. However this is partly offset by reduced column throughput because the density of CO is lower at lower temperatures. In order to achieve C-14 enrichment of at least 95% from feeds containing about ½ to about 2% C-14 0, it is necessary to employ a fractional distillation column employing a certain combination of reflux ratio and number of theoretical plates. As the reflux ratio is increased, the number of theoretical plates required for a given separation decreases. An optimum reflux ratio for the present separation is considered to be about 300 to about 450 (i.e. 300 to 450 moles of distillate returned to the column for each mole of distillate removed) and a corresponding preferred number of theoretical plates is about 1200 to 1500 in total. Since only a small through put is required a relatively dense column packing material may be employed which exhibits a correspondingly low theoretical plate height. Preferably, the packing has a theoretical plate height of about 1.5 to 4.5 cm. Examples of suitable packing materials comprise HELI-PAK (trademark)

3012 (type A) and HELI-PAK 3013 (type B) available from Podbielniak Inc. of Illinois, having theoretical plate heights of 2.4 cm. and 3.8 cm., respectively.

In order to reduce the height of the structure, the distillation apparatus may comprise columnar apparatus in the form of a number, for example four, columns disposed parallel to one another and connected in series.

Referring again to FIG. 2, carbon monoxide typically comprising about 0.5 to about 2% C-14 0 is pumped along line 92 by a vacuum pump 94. Initially the pump 94 may work in a closed loop 96 and the flow through the loop may be gradually decreased to avoid mechanical shock applied by the pump 94 on the piping. The output of the pump passes through a molecular sieve 98 which adsorbs any unconverted $CO_2$ which would tend to freeze up and block the distillation columns. The line 100 from the molecular sieve 98 enters a cold box envelope 102 which is maintained under vacuum (preferably about $10^{-3}$ Pa) and contains many heat reflective layers, for example aluminized MYLAR (trade-mark) to provide heat insulation.

The carbon monoxide is liquefied in a heat exchanger 104 fed with liquefied nitrogen along a line 106. Spent nitrogen is vented at 108.

The distillation apparatus comprises a series of four packed columns 110a, b, c and d, each having a condenser 112 connected to its upper end and an electrically resistively heated reboiler 114 at its lower end. The feed of liquefied CO is supplied along a line 111 to a point on the first column 110a adjacent its upper end, since at steady state the composition of the feed is close to that of the C-14 0-poor distillate. Each condenser 112 is supplied with liquid nitrogen along the line 106. Each column may operate at any condenser temperature in the range about 68 to about 132 K, namely about 68.14 K (the triple point of CO) to 132.92 K (the critical temperature of CO). Preferably the columns operate at atmospheric pressure (101 kPa) or below, and the condenser temperatures are in the range 68 to 82 K. The temperature of each condenser 112 may be controlled by reducing or increasing the pressure over the liquid nitrogen. A typical operating range is 101 to 32 kPa which changes the temperature from 77K to 68K. The distillate from each condenser 112 passes to a proportioning arrangement so that a large predetermined proportion of the distillate from each column is returned to the column as reflux along a line 115. The remainder of the distillate, in the case of the first column 110a, consists substantially wholly of the more volatile C-12 O and C-13 O components and is passed along a line 116. It is mixed with moist $O_2$ added along a line 118 to a vessel 120. A metal bellows type pump 122 passes the mixture over a heated oxidation catalyst, for example an electrically heated platinum wire 124. The resulting $CO_2$ is absorbed in absorbent, for example $Ca(OH)_2$ in a vessel 126 after cooling and addition of moist air along line 128. The resulting solid is disposed of periodically as low level waste. The non-$CO_2$ components of the gas stream (unreacted $O_2$ and air components) are vented to an active vent 130.

The non-refluxed distillate from the second and two succeeding columns 110b, c and d is passed along a line 132 to a point adjacent the reboiler from the preceding column. A controlled volume of the bottoms in each column is withdrawn and in the case of the first to third columns 110a, b and c is passed on a line 134 to a glove box 136 through a heat exchanger 138 and is pumped by a metal bellows type pump 140 through the heat exchanger 138 along a line 142 to a point adjacent the condenser in the succeeding column.

Product is taken from the reboiler of the last column 110d consisting substantially wholly of the less volatile C-14 O components. The product is withdrawn at a controlled flow rate along a line 144 passing through a secondary containment 146.

Because only a small proportion of feed is taken as bottoms product, the volume of the stream decreases toward the bottom of each column and for efficiency of operation of the columnar distillation apparatus, whether in the form of series connected parallel columns as shown in FIG. 2 or in the form of a single tall column, the column or columns preferably decrease in cross section from the waste distillate end to the product bottoms end. For example the columns 110a to d are preferably of progressively decreasing diameters.

It may be noted that a ventable buffer tank 147 is provided into which the contents of the columns 110a to d may be vented along a line 147a by allowing the columns to warm up to ambient temperature, in the event that shut down of the columns is desired.

Figure 3:
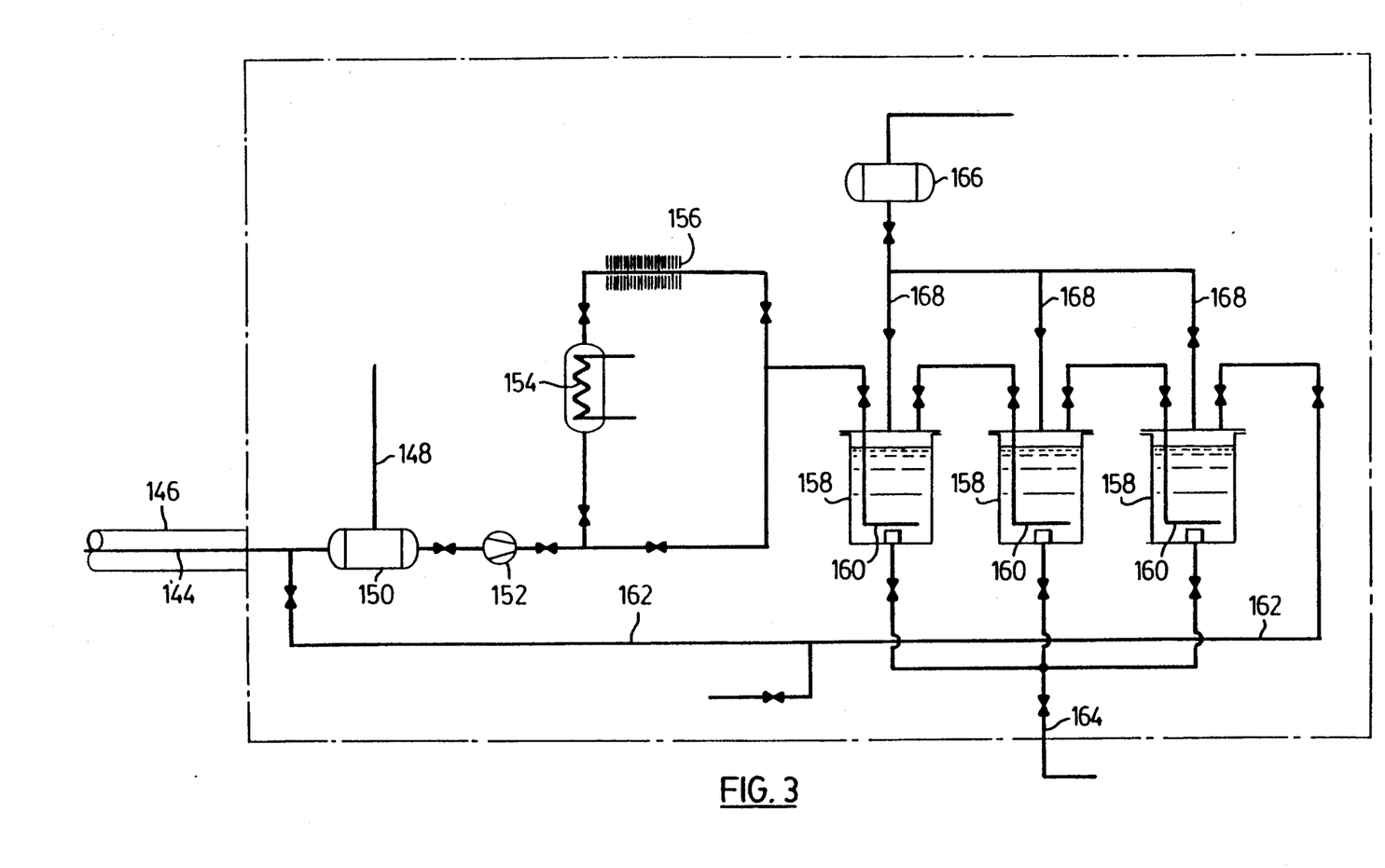

Referring to FIG. 3 this shows one preferred arrangement for packaging the C-14 product as a low vapour pressure product such as barium carbonate. C-14 O passed along line 144 is mixed with excess oxygen added on a line 148 to a vessel 150 and the mixture is pumped by a pump 152 over an oxidation catalyst at elevated temperature, for example an electrically resistively heated platinum wire 154. The reaction product, $CO_2$, is cooled in a finned heat exchanger 156 and is passed in series through three vessels 158 each containing a sparger 160 through which the gas enters a solution of an alkalin metal hydroxide, such as NaOH solution, or other solution which absorbs the C-14 $O_2$ to form a soluble carbonate salt. The gas is cycled in a loop along a line 162 so that substantially all $CO_2$ is absorbed. Periodically, $Na_2CO_3$ solution is run off from the vessels along a line 164 and is mixed with Ba $Cl_2$ solution to obtain a precipitate of $Ba_2CO_3$.

The precipitate of $Ba_2C-14O_3$ is filtered, dried and packaged. The filtrate is sent to active liquid waste. The vessels 158 are replenished With NaOH solution from a vessel 166 along lines 168.

Variations and modifications of the process described in detail above are of course possible.

For example, the procedure of stripping $CO_2$ from the ion exchange resin is preferably conducted in a batch process as described above, because of reasons of ease of control. Moreover, by selecting batches of varying C-14 loading and mixing the batches it is possible to maintain a substantially uniform C-14 abundance in the off gas taken from the reactor 10 along the line 34 so that uniformity of the abundance of C-14 in the product is maintained. However it is, of course equally possible although less advantageous to conduct the acid stripping of the resin continuously with co-current or countercurrent flow of the resin particles and acid. Moreover, instead of carrying out the fractional distillation as a continuous process it is, of course, possible to carry out repeated batchwise distillations of batches of the liquid CO in order to obtain a distillation bottoms residue product rich in C-14 O although with considerably less advantage than with the continuous process described in detail above.

Although the above description provides amply information to enable one of ordinary skill in the art to conduct the present process, for the avoidance of doubt a detailed example will be described.

EXAMPLE

A C-14 O poor liquefied carbon monoxide is subjected to fractional distillation using the apparatus described in detail with reference to FIG. 2. Each column is packed with HELI-PAK B. Each column is operated at a pressure of about 80 kPa, corresponding to a condenser temperature of 80K in each column. Table 1 provides the operating conditions and details of the structure of each column.

TABLE 1

| Parameter | Column 110a | 110b | 110c | 110d |
|---|---|---|---|---|
| Feed flow along lines 111 or 142 (mol CO/h) | 0.6056 | 0.1880 | 0.0494 | 0.0141 |
| No. of theoretical plates | 350 | 350 | 350 | 350 |
| Packing height cm (20% margin) | 1022 | 1022 | 1022 | 1022 |
| Feed plate no. (downwards from condenser) | 200 | 25 | 25 | 25 |
| Reflux ratio | 375 | 350 | 350 | 350 |
| Vapour flow in column above feed (mol/h) | 226.2 | 64.5 | 15.9 | 3.51 |
| Condenser pressure (kPa) | 80 | 80 | 80 | 80 |
| Reboiler pressure (kPa) | 92 | 92 | 92 | 92 |
| Reboiler duty (W) | 377.8 | 107.7 | 26.5 | 5.86 |
| Column i.d. (inches) | 2.469 | 1.380 | 0.674 | 0.307 |

The composition of the feed along line 111 and of the product along line 144 are given in Table 2.

TABLE 2

| Component | Feed (mole %) | Product (mole %) |
|---|---|---|
| C-12 O-16 | 97.9 | 0.005 |
| C-12 O-17 | 0.04 | 0.00004 |
| C-12 O-18 | 0.2 | 0.004 |
| C-13 O-16 | 1.1 | 0.9 |
| C-13 O-17 | 0.0004 | 0.006 |
| C-13 O-18 | 0.002 | 0.17 |
| C-14 O-16 | 0.7 | 98.7 |
| C-14 O-17 | 0.00028 | 0.04 |
| C-14 O-18 | 0.0015 | 0.2 |

What is claimed is:

1. Method for the recovery of carbon-14 (C-14) from a mixture of inert gas and carbon-12 (C-12), carbon-13 (C-13) and carbon-14 (C-14) dioxides comprising: (a) cooling said mixture to a temperature below the solidification point of carbon dioxide and above the solidification point of the inert gas to obtain solid carbon dioxide and separating said solid carbon dioxide from said inert gas; (b) volatilising said solid carbon dioxide to provide substantially pure carbon dioxide gas; (c) reducing said carbon dioxide gas to carbon monoxide gas and obtaining liquefied carbon monoxide; (e) subjecting a feed of said liquefied carbon monoxide to fractional distillation and obtaining a bottoms rich in C-14 monoxide and poor in C-12 monoxide and a distillate poor in C-14 monoxide and rich in C-12 monoxide; (f) oxidizing said bottom to carbon dioxide rich in C-14 dioxide and (g) absorbing said carbon dioxide rich in C-14 dioxide in a metal hydroxide solution and obtaining a carbonate salt rich in C-14.

2. Method as claimed in claim 1 wherein said mixture of inert gas and carbon-12, carbon-13 and carbon-14 dioxides is obtained from a reaction conducted in the aqueous phase and contains moisture and including the step of cooling said gas mixture to remove moisture from it before cooling it below the solidification point of carbon dioxide.

3. Method as claimed in claim 2 wherein the step of cooling said gas mixture to remove moisture from it comprises cooling to a temperature of about 274 to about 283K.

4. Method as claimed in claim 2 wherein the gas mixture is obtained by reaction of ion exchange resin having a loading of C-14 with an aqueous acid solution through which an inert gas is bubbled wherein said loading is in the form of carbonate or bicarbonate salt that is decomposed by said aqueous acid solution.

5. Method as claimed in claim 1 wherein the step of cooling said mixture of inert gas and carbon-12, carbon-13 and carbon-14 dioxides to a temperature below the solidification point of carbon dioxide comprises passing it through a vessel cooled with liquid nitrogen.

6. Method as claimed in claim 1 wherein the step of reducing said carbon dioxide gas to carbon monoxide gas comprises contacting said carbon dioxide gas with a metal dispersed in finely divided form on an inert porous carrier at a temperature of about 473 to 773 K to reduce said carbon dioxide to carbon monoxide.

7. Method as claimed in claim 6 wherein said temperature is about 573 to 773 K.

8. Method as claimed in claim 6 wherein said metal is zinc, copper or iron.

9. Method as claimed in claim 6 wherein said metal is zinc.

10. Method as claimed in claim 1 wherein the step of cooling said carbon monoxide gas and obtaining liquefied carbon monoxide comprises passing said carbon monoxide in heat exchange relationship with liquid nitrogen.

11. Method as claimed in claim 1 wherein step (e) includes conducting said fractional distillation in apparatus provided with packing having a theoretical plate height of about 1.5 to about 4.5 cm.

12. Method as claimed in claim 1 wherein step (e) includes conducting said fractional distillation in columnar fractional distillation apparatus provided with about 1200 to about 1500 theoretical plates in total and with a reflux ratio of about 300 to 450.

13. Method as claimed in claim 12 wherein said columnar apparatus comprises a condenser at an upper end wherein said distillate poor in C-14 monoxide is withdrawn and are boiler at a lower end wherein said bottoms rich in C-14 monoxide is withdrawn and said feed of liquefied carbon monoxide is introduced into said apparatus at an intermediate point adjacent said condenser.

14. Method as claimed in claim 13 wherein said condenser is maintained at a temperature of about 68 K to about 132 K.

15. Method as claimed in claim 14 wherein said condenser temperature is about 68 to about 82 K.

16. Method as claimed in claim 13 wherein said columnar apparatus comprises a plurality of columns disposed parallel to one another and connected in a series having a first, a last and at least one intermediate column, wherein each column has a condenser at its upper end and a reboiler at its lower end and the reboiler of each preceding column in said series is connected to an upper portion of each succeeding column in said series, the condenser in each succeeding column connected to the lower end of each preceding column, said distillate poor in C-14 being withdrawn from a first column in said series and said bottoms rich in C-14 being withdrawn from the reboiler of the last column in said series.

17. Method as claimed in claim 13 wherein said columnar apparatus decreases in cross sectional area from said upper end toward said lower end.

18. Method as claimed in claim 12 wherein said fractional distillation apparatus operates at a pressure less than about atmospheric.

19. Method as claimed in claim 1 wherein the step of oxidizing said bottoms comprises mixing said bottoms with oxygen and oxidizing the mixture over an oxidation catalyst.

20. Method as claimed in claim 19 wherein said the step of oxidizing comprises oxidizing over a heated platinum wire catalyst.

21. Method as claimed in claim 1 wherein said metal hydroxide is an aqueous solution of an alkali metal hydroxide forming a solution of a carbonate.

22. Method as claimed in claim 21 including the step of reacting said carbonate solution with a barium salt solution to yield a precipitate of barium carbonate.

* * * * *